April 29, 1952      W. C. MILLER      2,594,334
FERY-PRISM MONOCHROMATOR
Filed Sept. 24, 1949
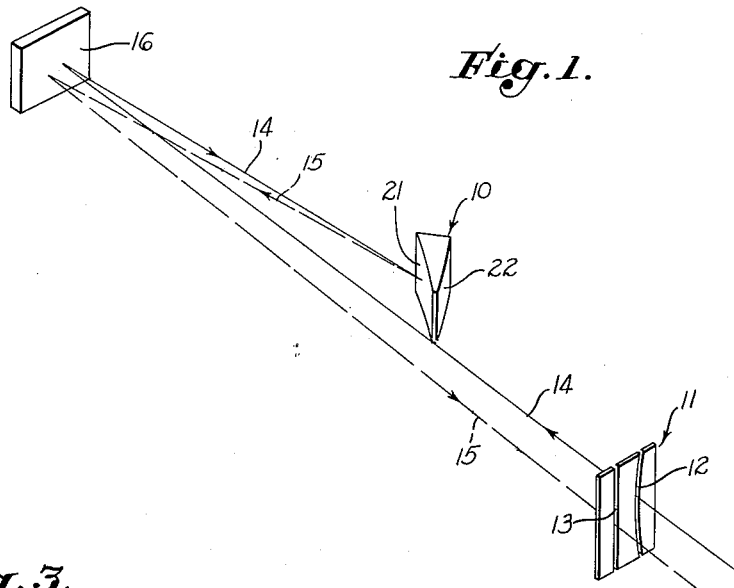
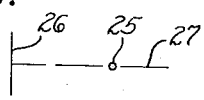
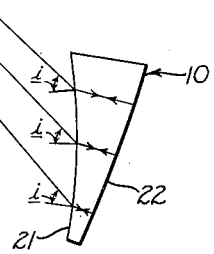
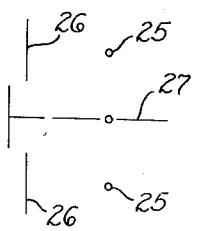
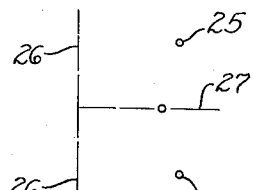
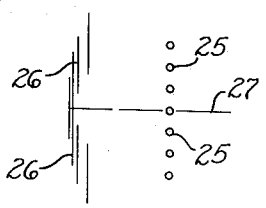
INVENTOR.
WILLIAM C. MILLER
BY HIS ATTORNEYS.
HARRIS, KIECH, FOSTER & HARRIS
BY Patented Apr. 29, 1952

2,594,334

UNITED STATES PATENT OFFICE 2,594,334

FERY-PRISM MONOCHROMATOR

William C. Miller, Pasadena, Calif., assignor to Beckman Instruments, Inc., a corporation of California Application September 24, 1949, Serial No. 117,557

5 Claims. (Cl. 88—14)

My invention relates in general to spectroscopy and, more particularly, to a spectroscopic device of the prism type for dispersing radiant energy into a spectrum. As a matter of convenience, the invention will be considered herein as embodied in a monochromator, although it will be understood that it may be embodied in other spectroscopic devices as well. Also as a matter of convenience, the invention will be discussed in connection with light, i. e., visible radiant energy, although it will be understood that it may be practised equally well with radiant energy of wave lengths without the visible range.

In order to distinguish the present invention from conventional monochromators of the prism type, it is necessary to consider the principal features of the latter briefly herein. Conventional prism monochromators utilize prisms of triangular cross section having plane surfaces, the light to be dispersed passing through the prism from one surface thereof to another. The light to be dispersed by such a prism must emanate from a source which has the form of a narrow line parallel to the refracting edge of the prism and bisected by its meridian plane, this being an essential requirement if a spectrum of maximum purity is to be attained in a minimum of space. Another requirement which is essential in this respect is that the light rays entering the prism must be substantially parallel since plane-surfaced prisms do not operate satisfactorily with nonparallel light. The foregoing requirements are met by employing for the line source a slit, termed an entrance slit, which is illuminated by any suitable source of the light to be dispersed, and by employing a collimating lens or mirror between the entrance slit and the prism. Still another requirement which must be fulfilled with a plane-surfaced prism is that the dispersed light must be focused into a spectrum, this being accomplished by means of an optical element such as a lens or mirror.

In order to isolate any of the component wave lengths of the light dispersed by the prism, another slit, termed the exit slit, is disposed in the plane of the spectrum. The exit slit excludes all wave lengths except those in a very narrow band of the spectrum and thus permits the isolation of light of great purity, i. e., permits the isolation of narrow light bands limited to only a very few wave lengths. Such light bands are substantially monochromatic, hence the application of the name "monochromator" to devices of this character.

The collimator employed in a conventional monochromator of the foregoing character is capable of parallelizing completely only those light rays which emanate from a point source. Thus, only those rays of light which emanate from the center of the entrance slit are parallel to the meridian plane, those from the ends of the slit being at slight angles to this plane. As a result, the light rays from the ends of the entrance slit impinge on the prism at slightly greater angles than those from the center of the slit and are therefore deviated slightly more than the rays from the center of the slit. Rays from points intermediate the center and ends of the entrance slit are also deviated excessively, but to a lesser extent.

The net result of such nonuniform deviation of light rays from various points along the entrance slit is that the image of the entrance slit which is formed in the plane of the spectrum is curved. As will be discussed in more detail hereinafter, it is important to note that such an image of the entrance slit is simply a curved line of substantially the same width as the entrance slit since it is the result only of nonuniform deviation.

If it is necessary that the image of the entrance slit be straight to coincide with a straight exit slit, this may be accomplished readily by employing an entrance slit which is so curved as to cancel the effects of the nonuniform deviation, the curvature being so chosen as to give a substantially straight image at the wavelength of most interest. Alternatively, an exit slit curved to match the curvature of the image of a straight entrance slit may be employed where a curved exit slit is not objectionable. As another alternative, the necessary curvature may be divided between the two slits. The foregoing variety of alternatives is possible only because the image is always a simple line, whether curved or straight.

In any monochromator, it is extremely important that scattering of the light passing through the device be minimized, the reason for this being that such scattering materially reduces the purity of the spectrum and also may decrease the energy at the desired wavelength which is available at the exit slit. It is impossible to eliminate this scattering completely since every optical element employed in a monochromator scatters some light. Such scattering of light by the optical elements represents a serious deficiency of conventional prism monochromators and a primary object of my invention is to provide a monochromator in which scattering of light is reduced to an absolute minimum.

More specifically, the primary object of the invention is to minimize such light scattering by reducing to the absolute minimum of one the number of optical elements employed.

Still more specifically, the primary object of the invention is to provide a monochromator having a prism which requires no collimating and imaging or focusing elements, thereby reducing the number of optical elements from two, three, or more, to the absolute minimum of one, and thereby reducing the light scattering to an absolute minimum.

I attain the foregoing primary object by employing for the prism of the monochromator of the invention a Fery prism, which is another object of the invention.

An important object is to provide a monochromator having means for obviating the effects of the extreme astigmatism which is characteristic of Fery prisms.

Another object is to obviate the effects of such astigmatism by providing a Fery-prism monochromator having a curved entrance slit and a straight exit slit.

In order to facilitate disclosing the invention, reference will now be had to the accompanying drawing which illustrates an exemplary embodiment capable of attaining the objects hereinbefore expressed, together with various other objects and various advantages which will be made evident hereinafter. Referring to the drawing:

Fig. 1 is a diagrammatic perspective view of a monochromator which embodies the invention;

Fig. 2 is a plan view of a Fery prism incorporated in the monochromator illustrated in Fig. 1;

Figs. 3, 4 and 5 illustrate the effects of the extreme astigmatism characteristic of Fery prisms when used in conjunction with a straight entrance slit; and Fig. 6 illustrates the manner in which the effects of such astigmatism are obviated by the present invention through the employment of a curved entrance slit and a straight exit slit.

Referring particularly to Fig. 1 of the drawing, the monochromator of the invention includes a Fery prism 10 and means 11, exemplified as a plate, for providing entrance and exit slits 12 and 13 which are respectively adapted to admit light or other radiant energy to the prism 10 and to receive refracted light from the prism, the path of the light rays directed toward the prism being indicated by the solid arrowed line 14 and the path of the refracted rays being indicated by the broken arrowed line 15. The exit slit 13 is perpendicular to and is bisected by the meridian plane of the prism 10 and lies on the circle diagram of the prism, such diagram being well known in the art. Solely in order to reduce the dimensions of the monochromator, a plane mirror 16 may be interposed between the Fery prism 10 and the slit-providing means 11, although it will be understood that the mirror 16 is not necessary.

As is well known in the art, the Fery prism 10 is capable of acting as a collimating element, a dispersing element and a focusing element. Considering the manner in which the Fery prism accomplishes this, the prism is provided with a first, or front surface 21 which is concave. Ideally, the first surface 21 is a three-dimensional logarithmic spiral. In practice, however, a spherical first surface is satisfactory, the center of curvature of the first surface lying on the circle diagram of the prism and the first surface having a radius of curvature equal to the diameter of the circle diagram, as is well known in the art. The radius of the spherical first surface 21 and the position of the entrance slit 12 relative to the prism 10 are so selected that different rays of light directed toward the prism through the center of the entrance slit all impinge upon the first surface at substantially equal angles of incidence $i$. The light rays impinging upon the spherical first surface 21 of the Fery prism 10 are refracted at the first surface and proceed into the prism as though they were radiating from a slit some distance from the entrance slit 12. This is suggested in Fig. 2 of the drawing.

The Fery prism 10 is provided with a rear or second surface 22 which is convex and which is reflective. Since, in the meridian plane, the refracted rays entering the prism 10 radiate from substantially a single point, a spherical surface for the second surface 22 is entirely satisfactory, the center of curvature of the second surface also lying on the circle diagram, but at a point spaced from the center of curvature of the first surface. The radius of the rear surface 22 is such that the refracted rays entering the prism 10 impinge upon the rear surface at an angle of incidence of 0°, i. e., normal to the rear surface. In other words, the center of curvature of the rear surface 22 is the point from which the refracted rays entering the prism virtually radiate.

The reflective rear surface 22 sends the refracted rays back on their original paths and toward their virtual source. Upon encountering the spherical first surface 21 again, they are re-refracted in such a manner that they form a spectrum along the circle diagram at the exit slit. The spectrum so produced may then be examined through the exit slit 13, or may be employed with an energy receiver in any appropriate manner, and different portions of the spectrum may be examined by shifting the Fery prism 10 relative to the slit-providing means 11.

Heretofore, the Fery prism has not been satisfactory for monochromators because of its extreme astigmatism, the latter being due to the high off-axis angles of incidence, $i$, at which the light rays strike the spherical first surface 21. As illustrated in Fig. 3 of the drawing, the astigmatism characteristic of the Fery prism is of such a nature and extent that a monochromatic point source 25 is imaged as a line 26, the length of the line image 26 varying with the focal length of the prism. As an example, in the case of a Fery prism having a focal length of eighteen inches, the length of the line image 26 is approximately three-quarters of an inch. As will become apparent, a factor of importance to the present invention is that the line image 26 is straight and is perpendicular to the meridian plane, which is designated by the numeral 27.

As illustrated in Fig. 4 of the drawing, if several of the point sources 25 are arranged in a straight line, a corresponding number of line images 26 are produced. However, these line images are offset laterally with respect to each other. (A point source 25 on one side of the meridian plane 27 is, of course, imaged on the opposite side thereof.)

Referring now to Fig. 5 of the drawing, it will be seen that as the number of aligned point sources 25 approaches infinity to provide, in effect, a line source (which may be regarded as a straight entrance slit), the image produced is composed of an infinite number of parallel line images 26 whose centers fall on a curve, the line images all being perpendicular to the meridian plane 27 of the prism. The result is an extremely bad smear of energy, particularly at the ends of the over-all image, definition being only fair even at the very center of the over-all image where the line images 26 are superimposed to some extent.

The present invention overcomes the foregoing by an entrance slit 12 which is curved in its plane and an exit slit 13 which is straight, the curvature of the entrance slit being such as to produce a substantially straight-line image of the entrance slit at the exit slit. In other words, the curvature of the entrance slit 12 is such that the infinite number of line images 26 produced by the infinite number of point sources 25 making up the entrance slit are all superimposed to obtain a straight-line image at the exit slit 13, the width of such image being substantially that of the entrance slit. This is illustrated in Fig. 6 of the drawing. The results of tests made with a Fery-prism monochromator embodying the invention demonstrate that excellent definition and resolution can be attained with the Fery prism in this manner. Thus, the present invention provides a Fery-prism monochromator which overcomes the effects of the inherent astigmatism of the Fery prism.

It is important to note that although curved entrance slits have been used heretofore in monochromators utilizing prisms with plane surfaces, the curved entrance slit 12 utilized in the monochromator of the present invention performs an entirely different function. In other words, in a conventional prism-type monochromator, a curved entrance slit is employed to compensate for nonuniform deviation of the light rays entering the prism, whereas I employ the curved entrance slit 12 to compensate for the tremendous astigmatism of the Fery prism 10. Also, different results are attained. More specifically, the curved entrance slit in the conventional monochromator merely straightens an image which would otherwise be simply a narrow, curved line. On the other hand, the curved entrance slit 12 in the monochromator of the present invention superimposes an infinite number of straight-line images, which would otherwise be arranged in a curve of such width as to be unusable in a monochromator, to produce a single, narrow straight-line image which is eminently satisfactory in a monochromator.

It is also important to note that, in conventional monochromators of the prism type, i. e., monochromators utilizing prisms with plane surfaces, the necessary slit curvature may be applied to either the entrance slit or the exit slit, or to both, as desired. In the monochromator of the present invention, however, the necessary curvature can be applied only to the entrance slit 12.

The radius of curvature of the entrance slit 12 depends upon several factors, among which are the index of refraction of the prism material, the focal length of the prism and the angle of incidence of the rays impinging upon the first surface 21 of the prism. The radius of curvature of the entrance slit may be related to the foregoing factors in accordance with the equation, $$R = \frac{n^2 f \cot an\ i}{2(n^2 - 1)}$$

wherein,

R is the radius of curvature of the entrance slit,
$n$ is the index of refraction of the prism,
$f$ is the focal length of the prism, and
$i$, as indicated previously, is the angle of incidence of the rays impinging upon the first surface 21 of the prism.

In addition to the foregoing factors, the wave length of the light or other radiant energy being examined affects the radius of curvature, R, of the entrance slit 12 because of its effect on the angle of incidence, $i$, of the rays impinging on the first surface 21 of the prism. The wave length, denoted by the symbol $w$, is related to $i$ in accordance with the equation, $$\sin i = \sin r \left( n_0 + \frac{c}{w - w_0} \right)$$

wherein:

$r$ is the angle of refraction of the prism, and
$n_0$, $c$ and $w_0$ are Hartman constants for the material of the Fery prism 10.

In view of the fact that the wave length affects the radius of curvature of the entrance slit 12 in the foregoing manner, it will be seen that an entrance slit 12 having a particular radius of curvature will produce an absolutely straight image at the exit slit 13 for only one wave length. However, by properly selecting the radius of curvature for a particular wave length to be investigated, only slight departures from linearity are encountered at the extremes of the range.

Although I have disclosed an exemplary embodiment of the invention for purposes of illustration, it will be understood that various changes, modifications and substitutions may be incorporated therein without departing from the spirit of the invention.

I claim as my invention:

1. In an apparatus of the character described, the combination of: a Fery prism, said prism having a refractive first surface and a reflective rear surface; and means providing an arcuate entrance slit and a linear exit slit respectively adapted to admit rays of radiant energy to said first surface of said prism and to receive refracted rays therefrom, the radius of curvature, R, of said arcuate entrance slit being related to the index of refraction, $n$, of said prism, the focal length, $f$, of said prism and the angle of incidence, $i$, of the rays impinging upon said first surface of said prism from said arcuate entrance slit substantially in accordance with the equation, $$R = \frac{n^2 f \cot an\ i}{2(n^2 - 1)}$$

2. An apparatus as set forth in claim 1 wherein $i$ is related to the wave length, $w$, of the radiant energy received by said linear exit slit substantially in accordance with the equation, $$\sin i = \sin r \left( n_0 + \frac{c}{w - w_0} \right)$$

wherein $r$ is the angle of refraction of said prism and $n_0$, $c$ and $w_0$ are Hartman constants for the prism material.

3. In an apparatus of the character described, the combination of: a Fery prism having a spherical front surface which is refractive and a spherical rear surface which is reflective, the centers of curvature of said surfaces being spaced apart along the circle diagram of said prism; and walls providing an entrance slit adapted to admit radiant energy to said front surface of said prism, said entrance slit being located on said circle diagram at a point spaced from said centers of curvature such that rays of radiant energy from said entrance slit make substantially equal angles of incidence with said front surface, whereby said rays are refracted through substantially equal angles by said front surface, the center of curvature of said rear surface being located on said circle diagram so that said refracted rays are substantially normal to said rear surface, said entrance slit being curved substantially in accordance with the equation, $$R = \frac{n^2 f \cotan i}{2(n^2-1)}$$

where R is the radius of curvature of said entrance slit, $f$ is the focal length of said prism, $n$ is the index of refraction of said prism and $i$ is the angle of incidence of the rays impinging upon said front surface, whereby said prism produces a substantially linear image of said entrance slit on said circle diagram adjacent said entrance slit.

4. An apparatus as defined in claim 3 including a linear exit slit aligned with said linear image adjacent said entrance slit and adapted to receive refracted radiant energy from said prism.

5. In an apparatus of the character described, the combination of: a Fery prism, said prism having a refractive first surface and a reflective rear surface; and means providing an arcuate entrance slit for admitting rays of radiant energy to said first surface, the radius of curvature, R, of said arcuate entrance slit being related to the index of refraction, $n$, of said prism, the focal length, $f$, of said prism and the angle of incidence, $i$, of the rays impinging upon said first surface of said prism from said arcuate entrance slit substantially in accordance with the equation, $$R = \frac{n^2 f \cotan i}{2(n^2-1)}$$

whereby said prism produces a substantially linear image of said curved slit.

WILLIAM C. MILLER.

REFERENCES CITED

The following references are of record in the file of this patent:

UNITED STATES PATENTS

| Number | Name | Date |
|---|---|---|
| 1,007,346 | Fery | Oct. 31, 1912 |

FOREIGN PATENTS

| Number | Country | Date |
|---|---|---|
| 625,906 | France | May 2, 1927 |

OTHER REFERENCES

Baly, E. C. C. "Spectroscopy," 3rd edition (1924), Longmans, Green & Co., New York, N. Y., volume 1, pages 120 and 121. (Copy in Division 7.)

Hardy, A. C., and Perrin, F. H., Principles of Optics, first edition, 1932, McGraw-Hill Book Co., New York, N. Y., pages 109, 115, 551, 552, 556, 557, and 558.

Journal, Optical Society of America, volume 31 (1941), pages 684, 685. (Copy in Division 7.)

Sawyer, R. A., "Experimental Spectroscopy" (1946), Prentice-Hall, Inc., New York, N. Y., pages 55, 56, 61, 62, 226, 227. (Copy in Division 7.)